(12) United States Patent
Rangel Augusto et al.

(10) Patent No.: US 11,888,740 B2
(45) Date of Patent: Jan. 30, 2024

(54) CLASSIFICATION AND FORWARDING NODE FOR INTEGRATING DISPARATE HEADEND TRAFFIC INGRESS SERVICES WITH DISPARATE BACKEND SERVICES

(71) Applicant: Cisco Technology, Inc., San Jose, CA (US)

(72) Inventors: Leonardo Rangel Augusto, Burnaby (CA); Stephen John Hassard, Surrey (CA); Kyle Andrew Donald Mestery, Woodbury, MN (US); Bernardo De Moraes Soares, Rio de Janeiro (BR)

(73) Assignee: Cisco Technology, Inc., San Jose, CA (US)

( * ) Notice: Subject to any disclaimer, the term of this patent is extended or adjusted under 35 U.S.C. 154(b) by 340 days.

(21) Appl. No.: 17/193,411

(22) Filed: Mar. 5, 2021

(65) Prior Publication Data

US 2022/0286392 A1    Sep. 8, 2022

(51) Int. Cl.
*H04L 45/74* (2022.01)

(52) U.S. Cl.
CPC .......... *H04L 45/74* (2013.01); *H04L 2212/00* (2013.01)

(58) Field of Classification Search
None
See application file for complete search history.

(56) References Cited

U.S. PATENT DOCUMENTS

| | | |
|---|---|---|
| 2015/0124828 A1 | 5/2015 | Cj et al. |
| 2016/0323165 A1 | 11/2016 | Boucadair et al. |
| 2017/0019331 A1 | 1/2017 | Yong |
| 2017/0279712 A1 | 9/2017 | Nainar et al. |
| 2019/0104111 A1 | 4/2019 | Cidon et al. |
| 2022/0338279 A1* | 10/2022 | Sahin .................... H04W 4/023 |

* cited by examiner

*Primary Examiner* — Christine T Duong
(74) *Attorney, Agent, or Firm* — Lee & Hayes, P.C.

(57) ABSTRACT

Techniques for integrating disparate headend traffic ingress services with disparate backend services are disclosed herein. The techniques may include receiving, at a classification and forwarding node of a networked computing environment, a data packet encapsulated according to a first encapsulation protocol that is supported by the classification and forwarding node. The techniques may also include determining, by the classification and forwarding node, that the data packet is to be sent to a service from among a group of services associated with the networked computing environment. The classification and forwarding node may also determine whether the first encapsulation protocol is supported by the service. Based at least in part on determining that the service supports a second encapsulation protocol different than the first encapsulation protocol, the classification and forwarding node may encapsulate the data packet according to the second encapsulation protocol and send the data packet to the service.

20 Claims, 8 Drawing Sheets

700

RECEIVE, AT A FIRST NODE OF A FIRST NETWORKED COMPUTING ENVIRONMENT AND FROM A SECOND NODE OF A SECOND NETWORKED COMPUTING ENVIRONMENT, A FIRST DATA PACKET ENCAPSULATED ACCORDING TO A FIRST ENCAPSULATION PROTOCOL THAT IS SUPPORTED BY THE FIRST NODE AND THE SECOND NODE
702

DETERMINE, BY THE FIRST NODE, THAT THE FIRST DATA PACKET IS TO BE SENT TO A FIRST SERVICE FROM AMONG A GROUP OF SERVICES ASSOCIATED WITH THE FIRST NETWORKED COMPUTING ENVIRONMENT
704

DETERMINE, BY THE FIRST NODE, WHETHER THE FIRST ENCAPSULATION PROTOCOL IS SUPPORTED BY THE FIRST SERVICE
706

DETERMINE THAT THE FIRST SERVICE SUPPORTS A SECOND ENCAPSULATION PROTOCOL DIFFERENT THAN THE FIRST ENCAPSULATION PROTOCOL
708

ENCAPSULATE THE FIRST DATA PACKET ACCORDING TO THE SECOND ENCAPSULATION PROTOCOL
710

SEND THE FIRST DATA PACKET TO THE FIRST SERVICE
712

FIG. 7

CLASSIFICATION AND FORWARDING NODE FOR INTEGRATING DISPARATE HEADEND TRAFFIC INGRESS SERVICES WITH DISPARATE BACKEND SERVICES

TECHNICAL FIELD

The present disclosure relates generally to improved techniques for integrating disparate headend traffic ingress services with disparate backend services, as well as securely transiting traffic between networked computing environments.

BACKGROUND

Building cloud-scale, distributed software as a service (SaaS) offerings can be challenging. The challenges come from not only the scale, but how to segregate tenants that utilize the services that are deployed. This segregation should naturally happen at the network layer, amongst other places, and it is at the network layer where the challenge of providing segregation at a mass scale proves challenging.

Additionally, providing a way to securely scale these tenants is yet another challenge. Encryption, decryption, and other security services are likely to be built and used on customer traffic entering and leaving a distributed SaaS offering. Providing a way to securely tie these disparate services together while minimally impacting the performance of the traffic is a challenge.

Furthermore, providing a way to steer traffic across data centers in a global deployment is a requirement and another challenge to solve. As services are built independent of one another, it is possible for a data center to be operational for one service but taken out of rotation for another service. Thus, ingress traffic of one data center may need to be sent to another data center for a certain service, and then sent back to the original data center to continue on to yet another data center.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 illustrates a logic flow diagram of an example method that may be performed by a first node to send a data packet to a service on behalf of a second node.

DESCRIPTION OF EXAMPLE EMBODIMENTS

Overview

Figure 1:
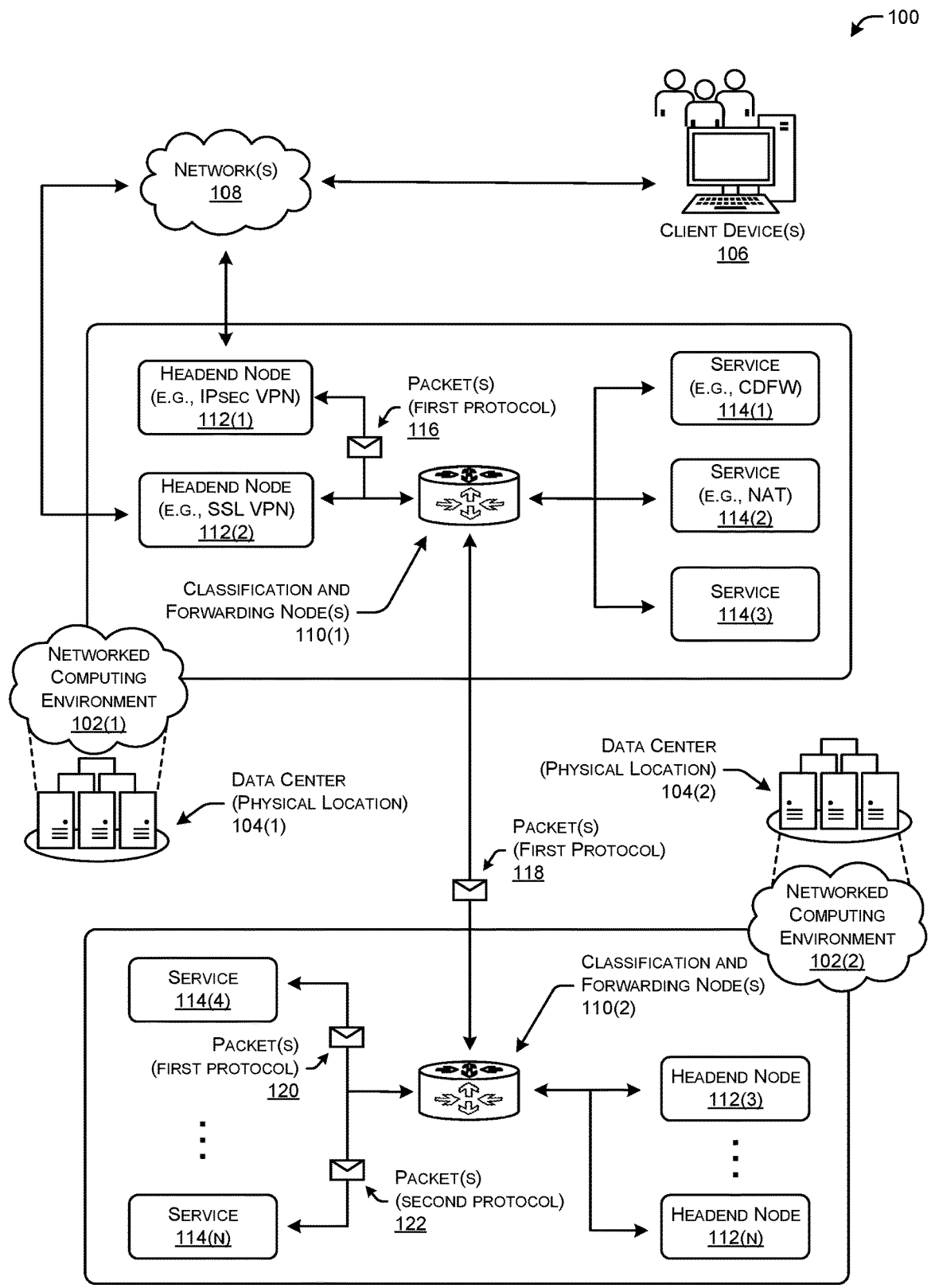
FIG. 1 illustrates a schematic view of an example system-architecture that includes example networked computing environments of a distributed SaaS offering.

This disclosure describes systems and methods that, among other things, improve technologies related to integrating disparate headend traffic ingress services with disparate backend services, as well as securely transiting traffic between networked computing environments. By way of example, and not limitation, a method according to the various techniques described in this disclosure may include receiving, at a classification and forwarding node, a first data packet encapsulated according to a first encapsulation protocol that is supported by the classification and forwarding node. The method may also include determining that the first data packet is to be sent to a first service from among a group of services, as well as determining whether the first encapsulation protocol is supported by the first service. Based at least in part on determining that the first service supports a second encapsulation protocol different than the first encapsulation protocol, the method may include encapsulating the first data packet according to the second encapsulation protocol and sending the first data packet to the first service.

In some examples, the classification and forwarding node may be associated with a first networked computing environment and the method may additionally or alternatively include determining that the first service is associated with a second networked computing environment different than the first networked computing environment. Based at least in part on determining that the first service is associated with the second networked computing environment, the method may include refraining from encapsulating the first data packet according to the second encapsulation protocol and sending the first data packet to another classification and forwarding node that is associated with the second networked computing environment such that the first data packet is sent to the first service.

Additionally, the techniques described herein may be performed as a method and/or by a system or device having non-transitory computer-readable media storing computer-executable instructions that, when executed by one or more processors, performs the techniques described herein.

EXAMPLE EMBODIMENTS

As discussed above, building cloud-scale, distributed software as a service (SaaS) offerings can be challenging. Some of the challenges associated with building a cloud-scale, distributed SaaS offering may include, among other things, segregating tenants that utilize the SaaS services at the network layer, securely scaling tenants, as well as integrating disparate headend traffic ingress services with disparate backend services. For instance, encryption, decryption, and other security services are likely to be built and used on customer traffic entering and leaving a distributed SaaS offering, and providing a way to securely tie services together while minimally impacting the performance of the traffic is a challenge.

As additionally noted above, as services are built independent of one another, it is possible for a data center to be operational for one service but taken out of rotation for another service. Thus, ingress traffic of one data center may need to be sent to another data center for a certain service, and then sent back to the original data center just to continue on to another data center. Take, for example, a case where geolocation data is used to ensure traffic egresses from a specific data center. For instance, a case when traffic is acquired at a first data center, but the first data center lacks a specific service. The traffic may be forwarded to a second data center where the specific service is running so that the specific service can operate on the traffic, and the traffic can then be sent back to the first data center to be egressed to the internet, or routed to a location specified by the tenant.

With these and other challenges in mind, described herein are technical solutions to technical problems associated with distributed SaaS offerings that, among other things, improve technologies related to integrating disparate headend traffic ingress services with disparate backend services, as well as securely transiting traffic between networked computing environments. For instance, the techniques described herein, in some examples, provide for a classification and forwarding node that improves these technologies. The classification and forwarding node may include functionality to, among other things, classify flows coming from headend components, chain flows between individual components of a single data center, as well as chain flows between multiple data centers. The classification and forwarding node may support ingress of layer 3 encapsulated packet formats (e.g., generic UDP encapsulation (GUE)), and headend nodes may implement the common layer 3 prescribed format such that the classification and forwarding node may classify and forward packets on behalf of the headend nodes. Additionally, the classification and forwarding node may add identification metadata (e.g., data center origination identifier, ingress security policy, globally unique flow identifier (virtual network identifier (VNI), and the like) to ingress encapsulated packets. For instance, the classification and forwarding node may add the identification metadata by using one or more extension fields of a GUE packet header and signal the existence of the identification metadata using a flag field of the GUE packet header. In even further examples, the classification and forwarding node may perform basic egress re-encapsulation to provide, for instance, Virtual eXtensible Local Area Network (VXLAN) and Generic Network Virtualization Encapsulation (GENEVE) support for services utilizing these protocols, as well as other protocols (e.g., Network Virtualization Using Generic Routing Encapsulation (NVGRE), Virtual Local Area Network (VLAN), Multiprotocol Label Switching (MPLS), etc.) utilized by various services.

The techniques disclosed regarding the classification and forwarding node may improve the operation of classification and forwarding of packets while using existing Linux components. For instance, classification may be done both actively (e.g., a fast path punting to a slow path classifier) or pro-actively (e.g., when a service is created, create a fast path forwarding in advance by understanding where to send packets for that flow). In some examples, eXpress Data Path (XDP) may be used to handle the fast path, allowing for NIC level metadata injection and header rewrite between packet formats. Because the classification and forwarding node is a service chaining forwarder, its packet forwarding decision may not made based on layer 3 or layer 4 information in the customer packet. Instead, the classification and forwarding node may implement an overlay-aware logic to construct a service path (e.g., which backend services that a given classified flow should go through) and ensure tunneled packets are routed through that service path.

Additionally, in some examples the classification and forwarding node may have data center-wide visibility into where services are located. Because of this, the classification and forwarding node may intelligently forward traffic to the appropriate service. Furthermore, services themselves may signal to the classification and forwarding node when their capacity is at risk of overflowing, or when the service is to be taken down for maintenance. This may allow for the classification and forwarding node to alter where it is forwarding traffic, allowing for operators to take down services in a manageable way.

In sum, the techniques described herein solve the challenges found in deploying multiple headend ingress services in cloud infrastructures. The techniques allow for the building and deployment of headend ingress services (e.g., IPsec VPNs, SSL VPNs, SD-WAN integration across different SD-WAN solutions, Direct Connect services, etc.) and tie them together to the broader flow of services of a networked computing environment without entangling the individual headends with those services. These are just some examples of the multiple improvements that may be realized according to the techniques described in this disclosure. These and other improvements will be easily understood and appreciated by those having ordinary skill in the art.

By way of example, and not limitation, a method according to the various techniques disclosed herein may include receiving, from a headend node and at a classification and forwarding node, a first data packet encapsulated according to a first encapsulation protocol that is supported by the classification and forwarding node. In some examples, the first encapsulation protocol may comprise a layer 3 encapsulation protocol, such as GUE, or any other encapsulation protocol. In at least one example, the headend node and the classification and forwarding node may be located within a same networked computing environment (e.g., same data center). In some examples, the headend node may comprise a headend ingress service, such as an IPsec VPN, an SSL VPN, an SD-WAN integration via Meraki and Viptela, a Direct Connect service, and/or the like.

The method may further include determining that the first data packet is to be sent to a first service from among a group of services. For instance, the classification and forwarding node may determine that the first data packet is to be sent to the first service based at least in part on routing information included in the first data packet. In some examples, the group of services may comprise a group of security services, such as a firewall service (e.g., a cloud-delivered firewall (CDFW)), a network address translation (NAT) service (e.g., NATaaS), or another security service. In at least one example, the first service and/or the group of services may be located within the same networked computing environment as the headend node and the classification and forwarding node.

In some examples, the classification and forwarding node may determine whether the first encapsulation protocol is supported by the first service. That is, the classification and forwarding node may determine whether the first service is capable of operating on or otherwise processing the first data packet if it is encapsulated according to the first encapsulation protocol. If the classification and forwarding node determines that the first service does not support the first encapsulation protocol and/or that the first service supports a second encapsulation protocol different than the first encapsulation protocol, then the classification and forwarding node may encapsulate (e.g., re-encapsulate) the first data packet according to the second encapsulation protocol and send the re-encapsulated first data packet to the first service. In some examples, the second encapsulation protocol may comprise, for instance, a GENEVE protocol, VXLAN protocol, MPLS protocol, VLAN protocol, NVGRE protocol, and/or the like. However, if the classification and forwarding node determines that the first service supports the first encapsulation protocol, then the classification and forwarding node may refrain from encapsulating (e.g., re-encapsulating) the first data packet according to the second encapsulation protocol and, instead, send the first data packet (which is encapsulated according to the first encapsulation protocol) to the first service.

In some examples, the classification and forwarding node may receive, from the first service, a second data packet encapsulated according to the second encapsulation protocol. For instance, the second data packet may represent a reply packet from the first service in response to receiving the first data packet. Additionally, or alternatively, the second data packet may comprise the first data packet after being operated on by the first service. Based at least in part on the second data packet being encapsulated according to the second encapsulation protocol, the classification and forwarding node may encapsulate (e.g., re-encapsulate) the second data packet according to the first encapsulation protocol and send the second data packet to the headend node.

In various examples, the classification and forwarding node may comprise a first classification and forwarding node of a first networked computing environment. In some examples the first classification and forwarding node may receive a second data packet encapsulated according to the first encapsulation protocol. The classification and forwarding node may receive the second data packet from the headend node or another headend node. In some instances, the classification and forwarding node may determine that the second data packet is to be sent to a second service of a second networked computing environment different than the first networked computing environment. For instance, the classification and forwarding node may determine that the second service is not running in a data center in which the classification and forwarding node is located, but rather that the service is running in a different data center. Accordingly, the classification and forwarding node may send the second data packet to a second classification and forwarding node of the second networked computing environment so that the second data packet may be operated on and/or processed by the second service. Additionally, in some examples, because the second data packet is being sent to the second classification and forwarding node of the second networked computing environment, the first classification and forwarding node may refrain from encapsulating (re-encapsulating) the second data packet according to the second encapsulation protocol because both classification and forwarding nodes support the first encapsulation protocol. As such, the second classification and forwarding node may determine whether or not the second data packet needs to be converted to the second encapsulation protocol in order to send the second data packet to the second service.

In some instances, the headend node may comprise a first headend node, and the classification and forwarding node may receive, from the first headend node, a second data packet encapsulated according to the first encapsulation protocol and determine that the second data packet is to be sent to a second headend node different than the first headend node. For instance, the first headend node may comprise an SSL VPN headend service and the second headend node may comprise an IPsec VPN headend service. As described above, because both the first headend node and the second headend node may be required to support a common prescribed layer 3 protocol format (in this case the first encapsulation protocol) to communicate with the classification and forwarding node, the classification and forwarding node may send the second data packet to the second headend node while refraining from performing any re-encapsulation on the second data packet.

In some examples, when the classification and forwarding node receives data packets, the classification and forwarding node may inject identification metadata into the packet header. For instance, the method performed by the classification and forwarding node may include modifying a header of the first data packet to include identification metadata. The identification metadata may include, among other things, an identifier of a networked computing environment in which the classification and forwarding node is located (in this example, an identifier corresponding with the first networked computing environment), an indication of an ingress security policy, and/or a globally unique flow identifier (e.g., a virtual network identifier (VNI)). In some instances, if the first encapsulation protocol is a GUE protocol, then the header of the first data packet may be modified such that an extension field of the GUE header includes the identification metadata and a flag field of the GUE header is set to signal the existence of the identification metadata.

In some examples, the first data packet may be associated with a particular traffic flow between the headend node and the first service, and the classification and forwarding node may store an indication of the particular traffic flow between the headend node and the first service at a location accessible by another classification and forwarding node. Additionally, or alternatively, the classification and forwarding node may send the indication of the particular traffic flow to the other classification and forwarding nodes to program the other classification and forwarding nodes with the particular traffic flow.

FIG. 1 illustrates a schematic view of an example system-architecture 100 that includes example networked computing environments 102(1) and 102(2) (hereinafter referred to collectively as "networked computing environments 102") of a distributed SaaS offering. Generally, the networked computing environments 102 may include devices that are housed or located in one or more data centers 104(1) and 104(2) (hereinafter referred to collectively as "data centers 104") that may be located at different physical locations. For instance, the networked computing environments 102 may be supported by networks of devices in a public cloud computing platform, a private/enterprise computing platform, and/or any combination thereof. The one or more data centers 104 may be physical facilities or buildings located across geographic areas that are designated to store networked devices that are part of the networked computing environments 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), networking (bandwidth), security services, and the like. However, in some examples the devices in the networked computing environment 102 may not be located in explicitly defined data centers 104 and, rather, may be located in other locations or buildings.

The networked computing environments 102 may be accessible to client devices 106 over one or more networks 108. The networked computing environments 102, and the networks 108, may each respectively include one or more networks implemented by any viable communication technology, such as wired and/or wireless modalities and/or technologies. The networked computing environments 102 and networks 108 may each include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.), Virtual Private Networks (VPNs), Wide Area Networks (WANs)—both centralized and/or distributed—and/or any combination, permutation, and/or aggregation thereof. The networked computing environments 102 may include devices, virtual resources, or other nodes that relay packets from one network segment to another by nodes in the computer network.

In some examples, the client devices 106 may comprise any type of device configured to communicate using various communication protocols (e.g., VPN, SSL, TLS, DTLS, and/or any other protocol) over the networks 108. For instance, the client device 106 may comprise a personal user device (e.g., desktop computers, laptop computers, phones, tablets, wearable devices, entertainment devices such as televisions, etc.), network devices (e.g., servers, routers, switches, access points, etc.), and/or any other type of computing device.

In some examples, the networked computing environments 102 may include one or more classification and forwarding nodes 110(1) and 110(2) (hereinafter referred to collectively as "classification and forwarding nodes 110"), one or more headend nodes 112(1)-112(N) (hereinafter referred to collectively as "headend nodes 112") (where N represents any number greater than or equal to one), and one or more services 114(1)-114(N) (hereinafter referred to collectively as "services 114") (where N represents any number greater than or equal to one). In various examples, the systems/devices/nodes of the networked computing environments 102 may communicate with one another via a management plane and/or a message bus associated with the networked computing environment 102. For instance, a common message bus associated with the networked computing environment 102 may enable a service, such as service 114(1), to signal to the classification and forwarding nodes 110(1) that it is being taken down for maintenance.

In various examples, the classification and forwarding nodes 110 may, among other things, classify individual traffic flows coming from the headend nodes 112, chain traffic flows between headend nodes and services in a single data center (e.g., between headend nodes 112(1) and 112(2) and services 114(1)-114(3) of the data center 104(1)), as well as chaining traffic flows between data centers (e.g., between data centers 104(1) and 104(2)). In this way, the classification and forwarding nodes 110 essentially take on the traditional roles of a classifier and a forwarder of a service chaining architecture. The classification and forwarding nodes 110 may support layer 3 encapsulated packet formats for ingress packets received from the headend nodes 112. That is, any packets 116 that are communicated between the classification and forwarding nodes 110 and the headend nodes 112 may be encapsulated according to a first protocol, such as GUE. Additionally, packets 118 sent between data centers by the classification and forwarding nodes 116 may also be encapsulated according to the first protocol. However, because different services 114 may support different protocols, the classification and forwarding nodes 110 may determine whether or not to re-encapsulate a specific packet according to a different protocol before sending the specific packet to a specific service. For instance, service 114(4) of FIG. 1 supports the first protocol, so the classification and forwarding node 110(2) may refrain from re-encapsulating packets 120 that are sent to the service 114(4). However, service 114(N) supports a second protocol, so the classification and forwarding node 110(2) may re-encapsulate packets 122 that are sent to the service 114(N). And similarly, any packets 122 received from the service 114(N) may need to be re-encapsulated according to the first protocol by the classification and forwarding node 110(2) before it may forward the packets 122 to the headend nodes 112(3)-112(N) and/or the classification and forwarding node 110(1).

The headend nodes 112 may comprise headend ingress services, such as IPsec VPNs, SSL VPNs, SD-WAN integration via Meraki and Viptela, Direct Connect services, and the like. As noted above, each of the headend nodes 112 may, in some instances, implement a common prescribed protocol format (e.g., GUE). For example, when the headend nodes 112 receive packets from the client devices, the headend nodes 112 may encapsulate the received packets according to the common prescribed protocol format before sending the packets to the classification and forwarding nodes 110.

The services 114 may, in some examples, comprise security services, such as a cloud delivered firewall (CDFW), a network address translation (NAT) service, and the like. As noted above, the services 114 may each support different protocols and/or packet structures, such as VXLAN, GENEVE, GUE, etc.

Figure 2:
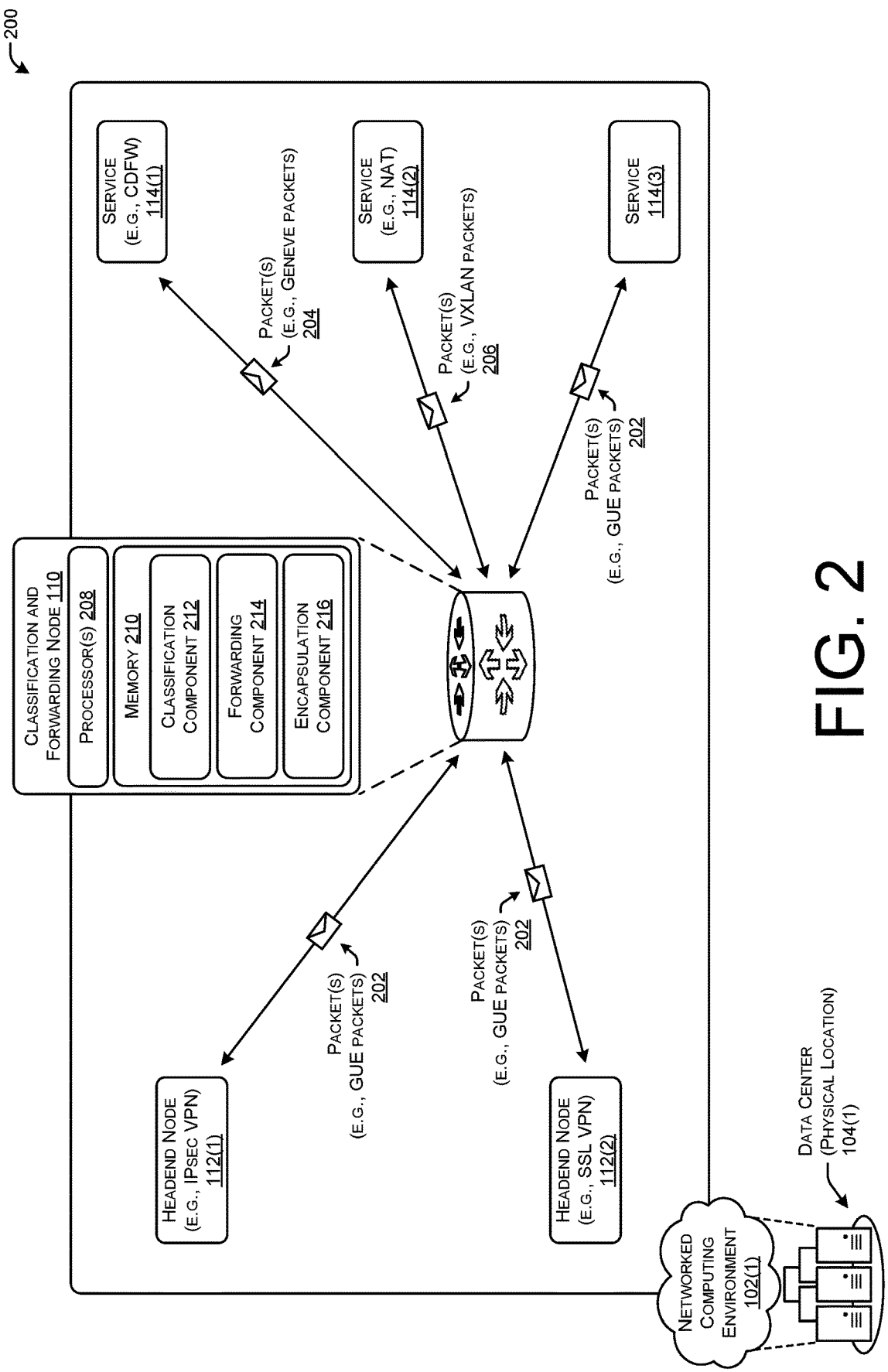
FIG. 2 illustrates a schematic view of an example system-architecture of a networked computing environment that includes a classification and forwarding node.

FIG. 2 illustrates a schematic view of an example system-architecture 200 of a networked computing environment 102(1) that includes a classification and forwarding node 110. The classification and forwarding node 110 may facilitate communication of packets between the headend nodes 112 and the services 114, between the headend nodes 112, and/or between the services 114.

As shown, the headend node 112(1) may represent an IPsec VPN ingress service and the headend nodes 112(2) may represent an SSL VPN service. Each of the headend nodes 112 may send and receive packets 202 to and from the classification and forwarding node 110. The packets 202 represent GUE encapsulated packets.

The service 114(1) may represent a cloud delivered firewall (CDFW) service and the service 114(2) may represent a network address translation (NAT) service. As such, the service 114(1) may support packets 204 that are encapsulated according to the GENEVE protocol, while the service 114(2) may support packets 206 that are encapsulated according to the VXLAN protocol. However, it is to be appreciated that some services, such as service 114(3) may support packets 202 that represent the GUE encapsulated packets. As such, whether or not the classification and forwarding node 110 re-encapsulates an individual packet may be optional based at least in part on the type of service the packet is to be sent to, what protocols the service supports, etc.

Also shown in FIG. 2 is example detail of the classification and forwarding node 110. The classification and forwarding node 110 may include one or more processors 208 and memory 210 that is communicatively coupled to the one or more processors 208. In this way, the memory 210 of the classification and forwarding node 110 may store components and/or instructions that, when executed by the one or more processors 208, cause the classification and forwarding node 110 to perform the various operations described herein. For instance, the memory 210 of the classification and forwarding node 110 may store a classification component 212, a forwarding component 214, and an encapsulation component 216.

The classification component 212 may classify flows coming from the various headends 112. That is, the classification component 212 may construct a service path for a classified flow. Accordingly, the classification component 212 may essentially perform the traditional role of a classifier of a classic service chaining architecture. In some examples, the classification component 212 may classify flows both actively (e.g., a fast path punting to a slow path classifier) and/or pro-actively (e.g., when a service is created, create a fast path forwarding in advance by understanding where to send packets for that flow). In some examples, the classification component 212 may utilize XDP to handle the fast path, thus allowing for NIC level metadata injection and header rewrite between packet formats. Additionally, in some examples, the classification component 212 and/or the classification and forwarding node 110 may integrate with a key-value store to store VNI mappings across the fleet of services 114.

The forwarding component 214 may essentially perform the role of a traditional forwarder of a classic service chaining architecture. In some examples, while the classification component 212 may construct a service path for a classified flow, the forwarding component 214 may ensure that individual, tunneled packets are routed through that flow. Additionally, because the classification and forwarding node 110 has datacenter-wide visibility into where the services 114 are located, the forwarding component 214 may intelligently forward traffic to the appropriate service. For instance, the services 114 themselves may signal when their capacity is at risk of overflowing or when they are taken down for maintenance, and this allows the forwarding component 214 to alter where it is forwarding traffic, allowing for operators to take down that service in a manageable way.

The encapsulation component 216 may perform packet de-encapsulation and packet re-encapsulation on behalf of the classification and forwarding node. For instance, the encapsulation component 216 may determine that a specific service supports a certain protocol and/or packet structure and, when packets are to be sent to that specific service, the encapsulation component 216 may re-encapsulate the packets according to the certain protocol. Additionally, the encapsulation component 216 may re-encapsulate packets received from these specific services such that the packets may be sent to other classification and forwarding nodes and/or headend nodes. In some examples, the encapsulation component 216 may further add identity metadata to ingress encapsulated packets in the form of extension fields of a GUE packet header, and the existence of the identity metadata and/or the extension fields may be signaled in a flags field of the GUE packet header. In some examples, the identity metadata may include a virtual network identifier (VNI), a data center point of origin, and an ingress security policy.

Figure 3:
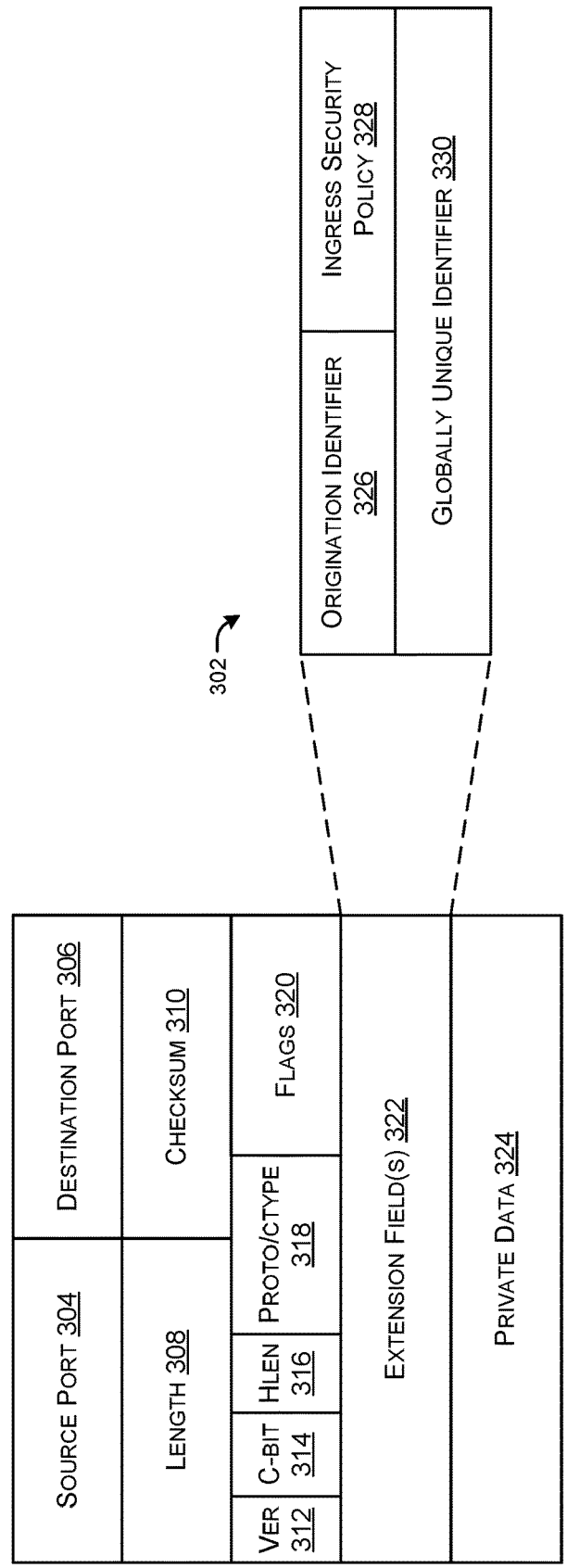
FIG. 3 is a block diagram illustrating example detail of an example packet header of a generic UDP encapsulation (GUE) protocol. The example packet header includes identification metadata within extension field(s) of the example packet header.

FIG. 3 is a block diagram illustrating example detail of an example packet header 300 of a generic UDP encapsulation (GUE) protocol. The example packet header 300 includes identification metadata 302 within extension field(s) 322 of the example packet header 300. As shown, the packet header 300 may include multiple contents/fields, such as a source port 304, destination port 306, length 308, checksum 310, version 312, C-bit 314, header length 316, proto/ctype field 318, flags 320, extension field(s) 322, and private data 324.

In some examples, the source port 304, destination port 306, length 308, and checksum 310 may comprise and/or correspond with a User Datagram Protocol (UDP) header, and the version 312, C-bit 314, header length 316, protocol/ctype 318, flags 20, extension field(s) 322, and private data 324 may comprise and/or correspond with a GUE header.

In some examples, the source port 304 of the packet header 300 may indicate a source port in the local tuple if connection semantics are applied to an encapsulation. In other examples, if connection semantics are not applied the source port 304 may be set to indicate a flow entropy value for use with equal cost multipath routing (ECMP). Similarly, with respect to the destination port 306, if connection semantics are applied to an encapsulation, the destination port 306 may be set to identify the destination port for the tuple. However, if connection semantics are not applied then the destination port 306 value may be set to the GUE assigned port number, which is 6080. The length 308 field of the packet header 300 may indicate the canonical length of the UDP packet. That is, the length 308 may indicate the length of the UDP header and payload. The checksum 310 may include a standard UDP checksum In examples, the version 312 of the packet header 300 may indicate the specific GUE protocol version that is to be used. The C-bit 314 of the packet header 300, when set, may indicate that the message is a control message. When the C-bit 314 is not set, the C-bit 314 may indicate that the message is a data message. The header length 316 field of the packet header 300 may indicate a length, in 32-bit words, of the GUE header, including optional extension field(s) 322 but not the first four bytes of the header. In some examples, the proto/ctype field 318 may indicate the type of the GUE payload. This may either be an IP protocol number or a control message type number. In some instances, when the C-bit 314 is set the proto/ctype field 318 may contain a control message type for the payload. In other instances, when the C-bit 314 is not set, the proto/ctype field 318 may hold the Internet protocol number for the encapsulated packet in the payload.

In examples, the flags field 320 may be used for various purposes and may indicate a presence of extension field(s) 322. In various examples, undefined header flag bits may be set to zero on transmission. The extension field(s) 322 may be optional and their presence may be indicated by corresponding flags of the flags field 320. As shown, the extension field(s) 322 may be used to include identity metadata 302. The identity metadata 302 may include an origination identifier 326, an ingress security policy 328, and a globally unique identifier 330. In some examples, the origination identifier 326 may include a datacenter point of origin indicating a datacenter in which the packet originated. In some examples, the globally unique identifier 330 may include a virtual network identifier (VNI) that is mapped across a fleet of services, such as the services 114. In some instances, the origination identifier 326 and/or the ingress security policy 328 may comprise 16-bit values and the globally unique identifier 330 may comprise a 64-bit value.

In examples, the packet header 300 may also include private data 324. In some instances, including the private data 324 may be optional. If the private data 324 is present, in at least one example the private data 324 may immediately follow the last extension field 322 present in the packet header 300. Additionally, the length of the private data 324 may be determined by subtracting a starting offset from the header length 316.

Figure 4:
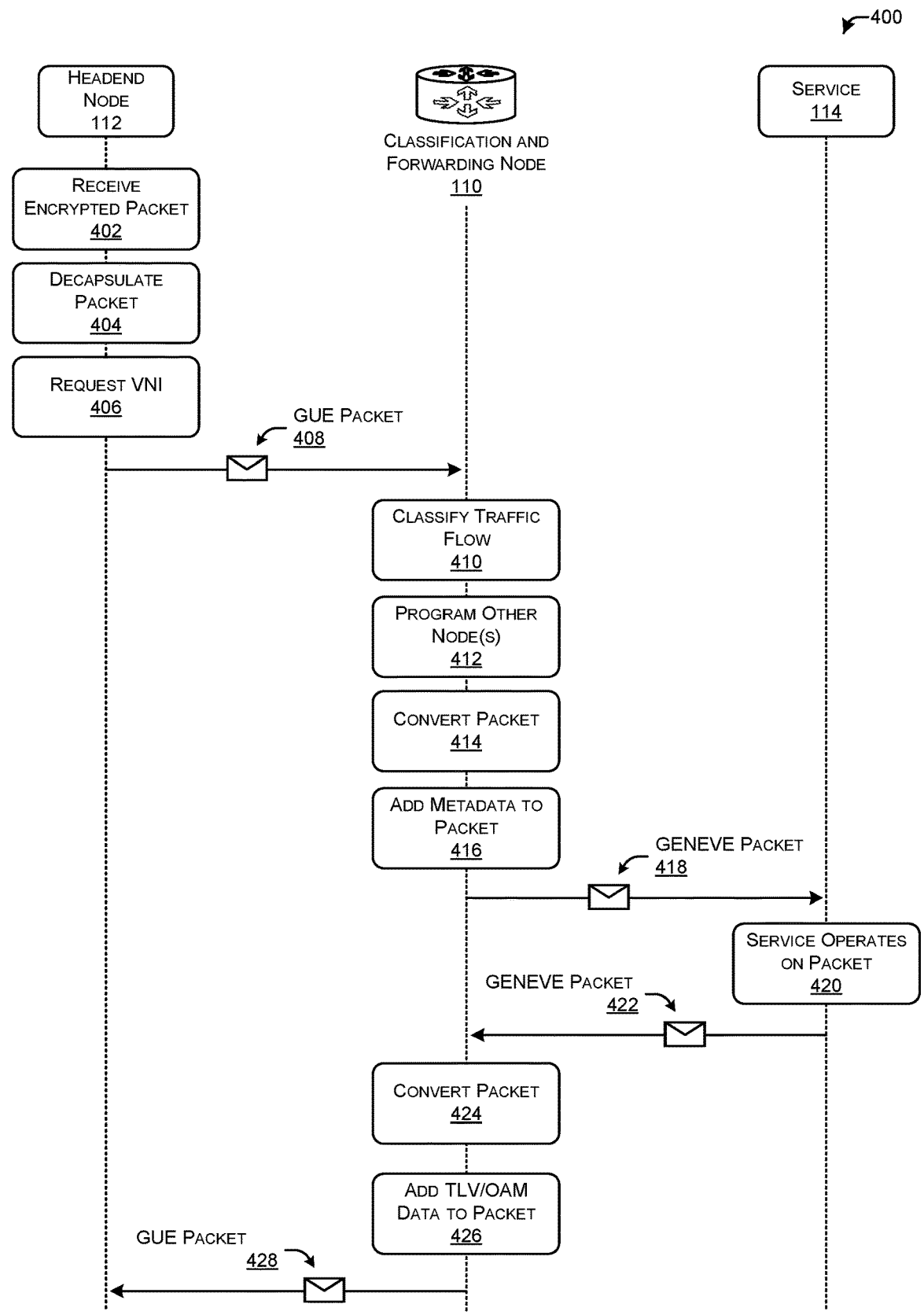
FIG. 4 illustrates a data flow diagram of an example traffic flow in which a classification and forwarding node facilitates communication of traffic having different protocols between a headend node and a service.

FIG. 4 illustrates a data flow diagram of an example traffic flow 400 in which a classification and forwarding node 110 facilitates communication of traffic having different protocols between a headend node 112 and a service 114. The various operations described in FIG. 4 may be implemented in software, in firmware, in special purpose digital logic, and any combination thereof. It should also be appreciated that more or fewer operations might be performed than shown in the FIG. 4. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At 402, the headend node 112 may receive an encrypted packet. In some instances, the headend node 112 may receive the encrypted packet from a client device, such as client devices 106. Additionally, in some examples, the encrypted packet may be encrypted according to various encryption protocols, such as Internet Protocol Security (IPsec), Secure Sockets Layer (SSL), Point-to-Point Tunneling Protocol (PPTP), Hypertext Transfer Protocol Secure (HTTPS), and/or the like. At 404, the headend node 112 may decapsulate or otherwise decrypt the encrypted packet. In some examples, the headend node 112 may re-encapsulate the packet according to a GUE protocol or any other encapsulation protocol that is supported by the classification and forwarding node 110.

At 406, the headend node 112 may request a virtual network identifier (VNI) associated with the packet. For instance, the headend node 112 may form a request to a control plane (e.g., registration service) for the control plane to provide a globally unique identifier and/or VNI to be used to identify the packet through the routing plane. At 408, the headend node 112 may send the packet to the classification and forwarding node 110. The packet may be encapsulated according to the GUE protocol or another encapsulation protocol.

At 410, the classification and forwarding node 110 may, based at least in part on receiving the packet from the headend node 112, classify the traffic flow associated with the packet. That is, the classification and forwarding node 110 may record what the traffic flow is. In this way, at 412, the classification and forwarding node 110 may program other classification and forwarding nodes with the traffic flow. In some examples, the classification and forwarding node 110 may program all other classification and forwarding nodes with the flow identifier (e.g., VNI). In this way, the other classification and forwarding nodes may know where packets are to be routed before they are ever received.

At 414, the classification and forwarding node 110 may convert the packet by re-encapsulating the packet according to a GENEVE protocol or any other encapsulation protocol that is supported by a service to which the packet is to be sent. That is, the classification and forwarding node 110 may determine where (e.g., which service) the packet is to be sent, determine which protocols are supported by the service, and then encapsulate the packet according to that service. Thus, it is to be understood that, although FIG. 4 depicts the classification and forwarding node 110 as encapsulating the packet according to the GENEVE protocol for illustration purposes, the classification and forwarding node 110 may encapsulate the packet according to any encapsulation protocol that is supported by the service 114.

At 416, the classification and forwarding node 110 may add metadata to the packet. The metadata may include, among other things the virtual network identifier (VNI), a datacenter point of origin (e.g., ingress datacenter), and an ingress security policy. In some examples, the metadata may be added to the packet using extension fields of the GUE packet header. At 418, the classification and forwarding node 110 may send the packet to the service 114. The packet may be encapsulated according to the GENEVE protocol, as shown.

At 420, the service 114 may operate on the packet. In examples, the service 114 may comprise a firewall, a NAT service, proxy service, IDS service, IPS service, IPsec service, SSL service, Wireguard service, and/or any network service. Additionally, at 422, the service 114 may send the packet and/or return traffic back to the classification and forwarding node 110. The return packet may be encapsulated according to the GENEVE protocol.

At 424, the classification and forwarding node 110 may receive the returned packet from the service 114 and convert the packet by re-encapsulating it according to the GUE protocol. In this way, the packet may be sent to the headend node 112. Additionally, at 426, the classification and forwarding node 110 may add type-length-value (TLV) data and/or operations, administration, and maintenance (OAM) data to the packet. In some examples, the TLV/OAM data may be added to the packet using extension fields of the GUE packet header. Finally, at 428, the classification and forwarding node 110 may send the packet back to the headend node 112. The packet may be encapsulated according to the GUE protocol.

Figure 5:
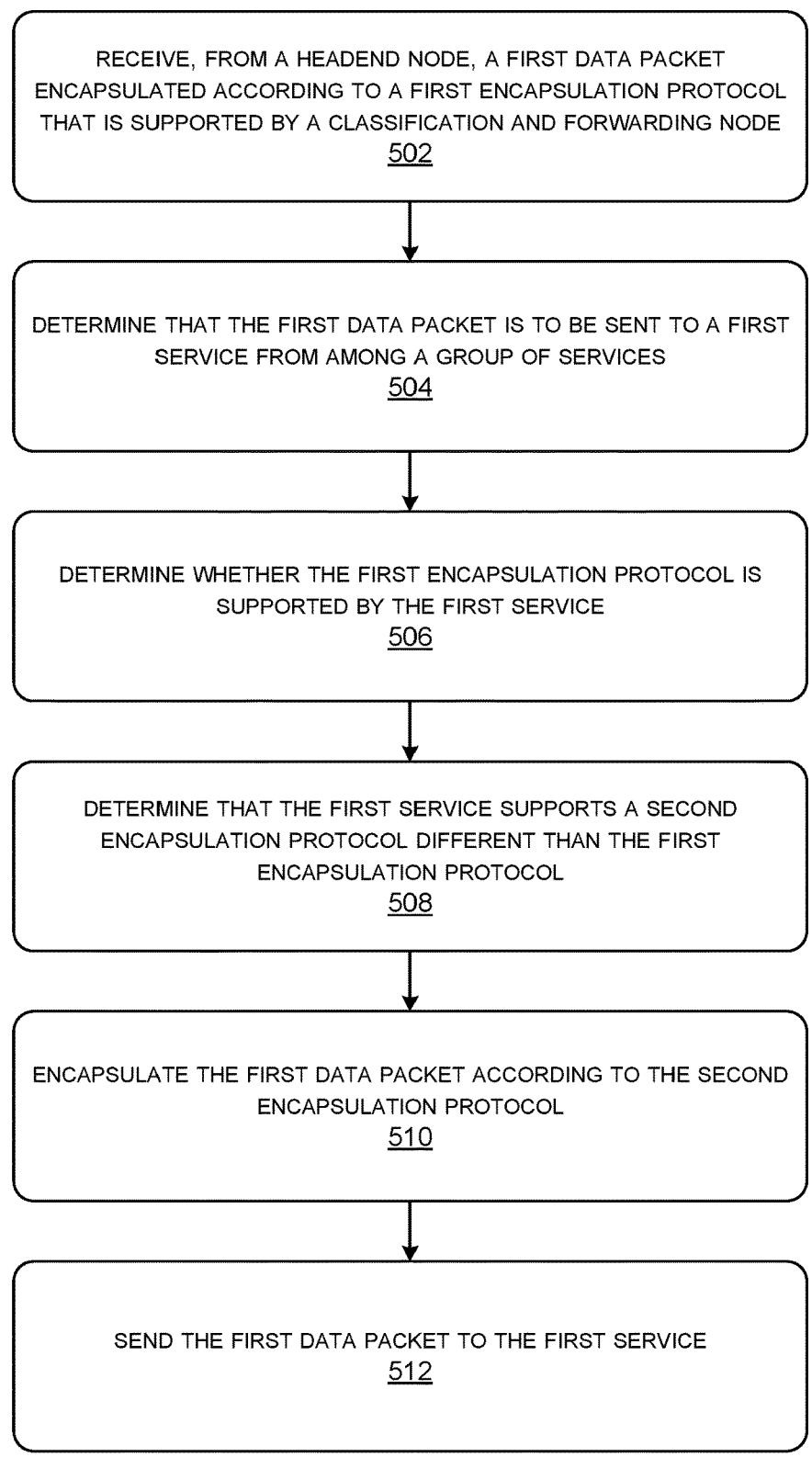
FIG. 5 illustrates a logic flow diagram of an example method that may be performed by a classification and forwarding node to send a data packet to a service.
Figure 6:
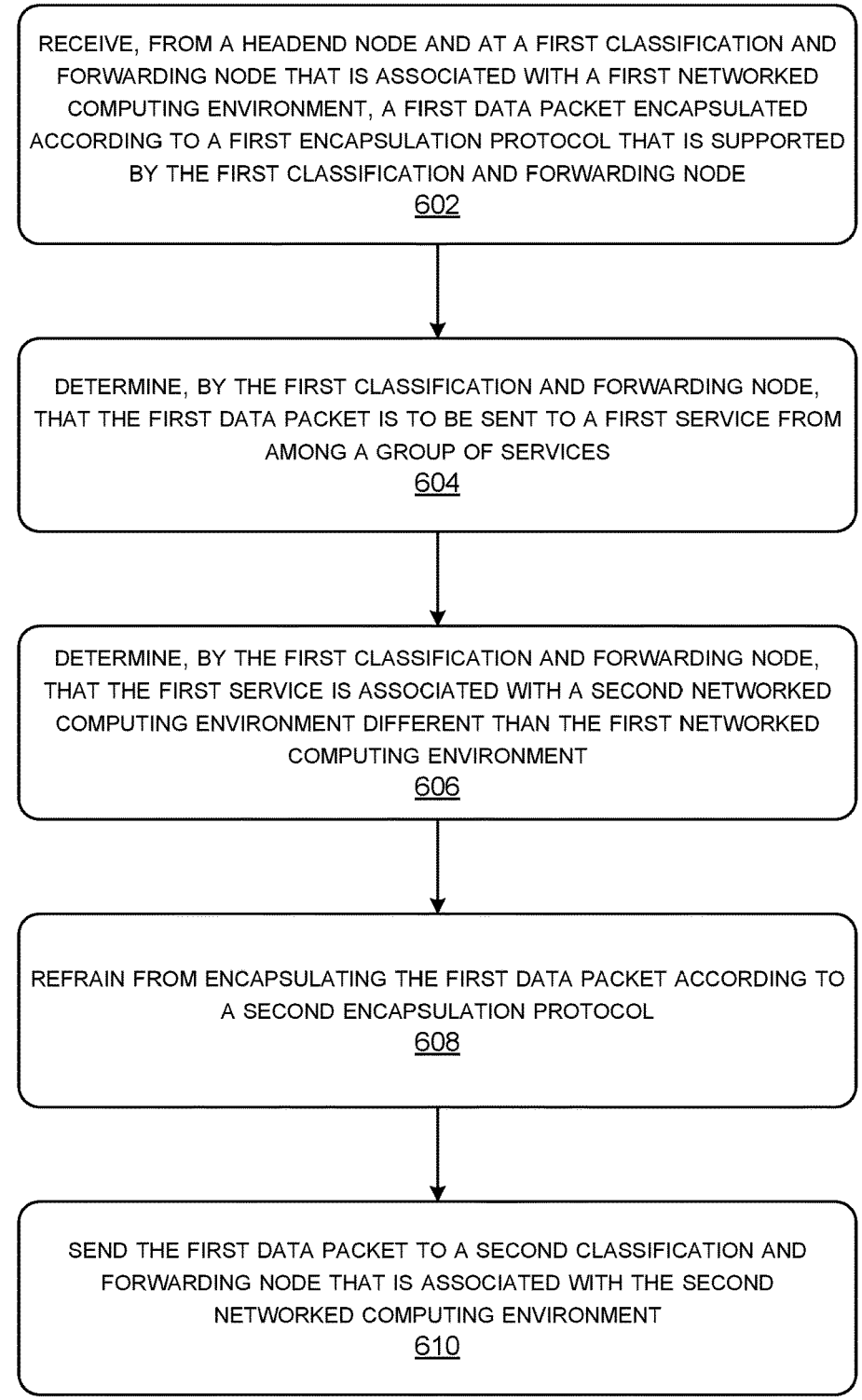
FIG. 6 illustrates a logic flow diagram of an example method that may be performed by a classification and forwarding node to send a data packet to a service located in a different networked computing environment.

FIGS. 5-7 illustrate logic flow diagrams of various example methods associated with the technologies presented herein for, among other things, providing a classification and forwarding node that integrates disparate headend traffic ingress services with disparate backend services, as well as securely transits traffic between networked computing environments. The logical operations described herein with respect to FIGS. 5-7 may be implemented (1) as a sequence of computer-implemented acts or program modules running on a computing system and/or (2) as interconnected machine logic circuits or circuit modules within a computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5-7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a logic flow diagram of an example method 500 that may be performed by a classification and forwarding node, such as classification and forwarding nodes 110, to send a data packet to a service, such as services 114. In other words, some or all of the operations 502-512 may be performed by the classification and forwarding nodes 112 described in FIGS. 1, 2, and 4.

The method 500 begins at operation 502, which includes receiving, from a headend node, a first data packet encapsulated according to a first encapsulation protocol that is supported by the classification and forwarding node. In examples, the first encapsulation protocol may comprise a GUE protocol. The headend node and the classification and forwarding node may be located in a same data center or same networked computing environment. Additionally, the first headend node may comprise a headend ingress service, such as an IPsec VPN, an SSL VPN, an SD-WAN integration via Meraki and Viptela, a Direct Connect service, and/or the like.

At operation 504, the method 500 includes determining that the first data packet is to be sent to a first service from among a group of service. For instance, the classification and forwarding node may determine that the first data packet is to be sent to the first service based at least in part on routing information included in the first data packet, a VNI of the first data packet, classifying a flow associated with the first data packet, and the like. In some examples, the group of services may comprise a group of security services, such as a firewall, a NAT service, or another network service. In at least one example, the first service and/or the group of services may be located within the same networked computing environment as the headend node and the classification and forwarding node.

At operation 506, the method 500 includes determining whether the first encapsulation protocol is supported by the first service. That is, the classification and forwarding node may determine whether the data packet needs to be converted to another packet protocol such that the data packet may be sent to, and received by, the first service. At operation 508, the method 500 includes determining that the first service supports a second encapsulation protocol different than the first encapsulation protocol. In other words, the classification and forwarding node may determine that the first service does not support the first encapsulation protocol and, instead, that the first service supports the second encapsulation protocol. In some examples, the second encapsulation protocol may comprise, for instance, a GENEVE protocol, VXLAN protocol, MPLS protocol, VLAN protocol, NVGRE protocol, and/or the like.

At operation 510, the method 500 includes encapsulating (or re-encapsulating) the first data packet according to the second encapsulation protocol. Encapsulating the first data packet according to the second encapsulation protocol may be based at least in part on determining that the first service does not support the first encapsulation protocol and/or that the first service supports the second encapsulation protocol. And at operation 512, the method 500 includes sending the first data packet (which is encapsulated according to the second protocol) to the first service.

FIG. 6 illustrates a logic flow diagram of an example method 600 that may be performed by a classification and forwarding node to send a data packet to a service located in a different networked computing environment. For instance, with reference to FIG. 1, the classification and forwarding node 110(1) may perform some or all of the operations 602-610 of the method 600 to send a data packet to the service 114(4) that is running on the networked computing environment 102(2) of data center 104(2).

The method 600 begins at operation 602, which includes receiving, from a headend node and at a first classification and forwarding node that is associated with a first networked computing environment, a first data packet encapsulated according to a first encapsulation protocol that is supported by the first classification and forwarding node. For instance, the classification and forwarding node 110(1) may receive the first data packet from the headend node 112(1).

At operation 604, the method 600 includes determining, by the first classification and forwarding node, that the first data packet is to be sent to a first service from among a group of services. At operation 606, the method 600 includes determining, by the first classification and forwarding node, that the first service is associated with a second networked computing environment different than the first networked computing environment. For instance, the classification and forwarding node 110(1) may determine that the first packet is to be sent to a service that is not running or otherwise located within the data center 104(1), such as the service 114(N) of the data center 104(2). Accordingly, the classification and forwarding node 110(1) may determine that the first data packet is to be sent to the classification and forwarding node 110(2) of the data center 104(2) such that the classification and forwarding node 110(2) may forward the first data packet to the service 114(N).

At operation 608, the method 600 includes refraining from encapsulating the first data packet according to a second encapsulation protocol. For instance, because the first data packet is to be sent to the classification and forwarding node 110(2) of the data center 104(2), the classification and forwarding node 110(1) may refrain from encapsulating the first data packet according to the second encapsulation protocol (e.g., keep the first data packet encapsulated according to the first encapsulation protocol). And finally, at operation 610, the method 600 includes sending the first data packet to a second classification and forwarding node that is associated with the second networked computing environment. For instance, as noted above, the classification and forwarding node 110(1) may send the first data packet to the classification and forwarding node 110(2) of the data center 104(2) such that the classification and forwarding node 110(2) may forward the first data packet to the service 114(N).

FIG. 7 illustrates a logic flow diagram of an example method 700 that may be performed by a first node to send a data packet to a service on behalf of a second node. For instance, some or all of the operations 702-712 of the method 700 may be performed by the classification and forwarding node 110(2) to send a data packet to a service (e.g., service 114(N)) on behalf of the classification and forwarding node 110(1).

The method 700 begins at operation 702, which includes receiving, at a first node of a first networked computing environment and from a second node of a second networked computing environment, a first data packet encapsulated according to a first encapsulation protocol that is supported by the first node and the second node. For instance, with reference to FIG. 1, the first node may comprise the classification and forwarding node 110(2) and the second node may comprise the classification and forwarding node 110(1). In examples, the first encapsulation protocol may comprise a GUE protocol.

At operation 704, the method 700 includes determining, by the first node, that the first data packet is to be sent to a first service from among a group of services associated with the first networked computing environment. For instance, the classification and forwarding node 110(2) may determine that the first data packet is to be sent to the service 114(N). In examples, determining that the first data packet is to be sent to the first service may be based at least in part on routing information and/or a VNI included in the first data packet.

At operation 706, the method 700 includes determining, by the first node, whether the first encapsulation protocol is supported by the first service. That is, the first node may determine whether the first data packet needs to be converted to another packet protocol such that the first data packet may be sent to, and received by, the first service. At operation 708, the method 700 includes determining that the first service supports a second encapsulation protocol different than the first encapsulation protocol. In other words, the first node may determine that the first service does not support the first encapsulation protocol and, instead, that the first service supports the second encapsulation protocol. In some examples, the second encapsulation protocol may comprise, for instance, a GENEVE protocol, VXLAN protocol, MPLS protocol, VLAN protocol, NVGRE protocol, and/or the like.

At operation 710, the method 700 includes encapsulating the first data packet according to the second encapsulation protocol. Encapsulating the first data packet according to the second encapsulation protocol may be based at least in part on determining that the first service does not support the first encapsulation protocol and/or that the first service supports the second encapsulation protocol. And at operation 712, the method 700 includes sending the first data packet (which is encapsulated according to the second encapsulation protocol) to the first service. For instance, the classification and forwarding node 110(2) may send the first data packet to the service 114(N).

Figure 8:
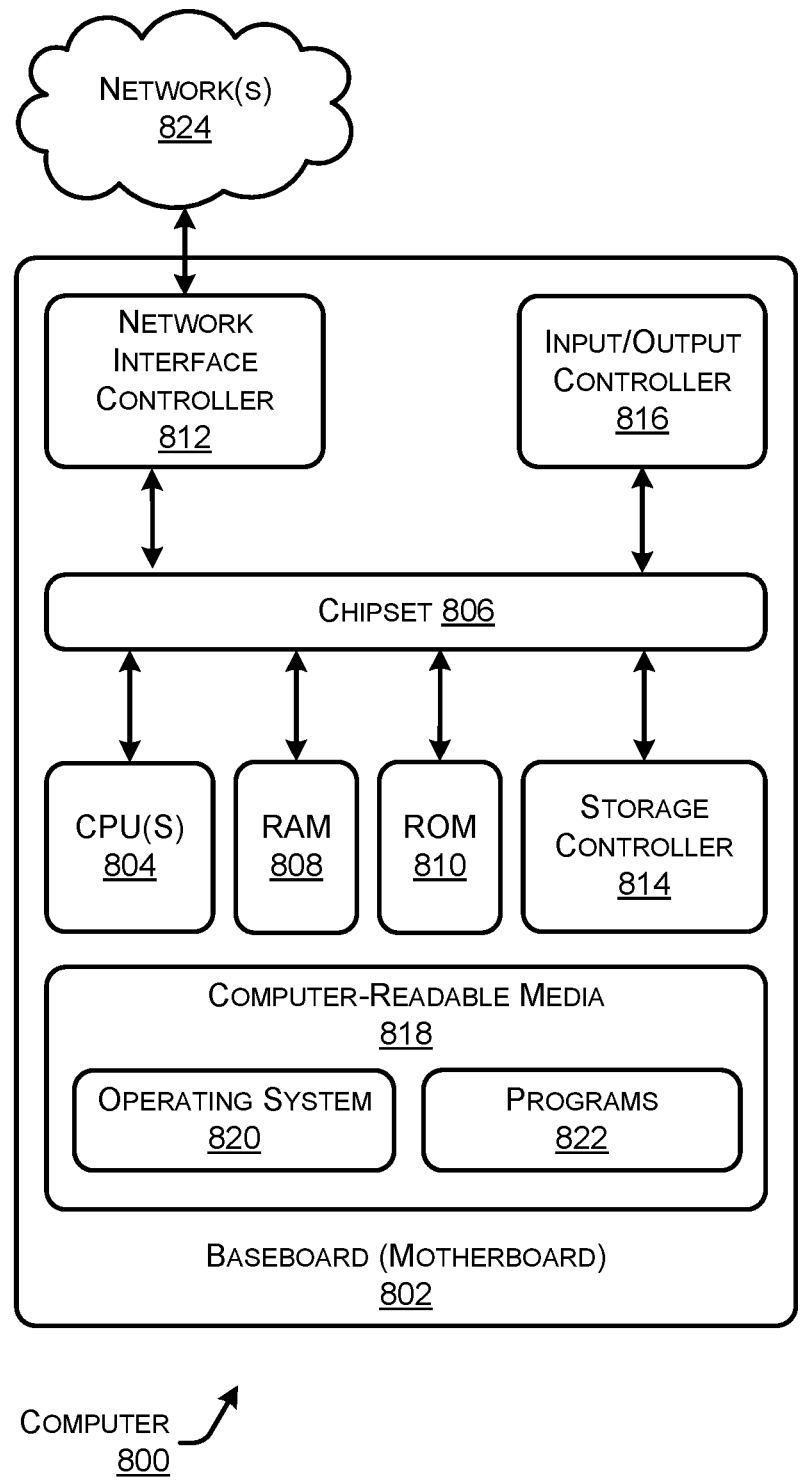
FIG. 8 illustrates a schematic view of an example computer-hardware architecture for implementing a network node and/or device, such as a load balancer, control node, data node, etc. that can be utilized to implement aspects of the various technologies presented herein.

FIG. 8 illustrates a schematic view of an example computer-hardware architecture for implementing a network node and/or device, such as a classification and forwarding node, headend node, service, etc., that can be utilized to implement aspects of the various technologies presented herein. The computer architecture shown in FIG. 8 illustrates a conventional server computer, router, network device, workstation, desktop computer, laptop, tablet, network appliance, e-reader, smartphone, and/or other computing device, and can be utilized to execute any of the software components presented herein. The computer 800 may comprise networked devices such as servers, switches, routers, hubs, bridges, gateways, modems, repeaters, access points, etc.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network(s) 108 and/or the network(s) 824. The chipset 806 can include functionality for providing network connectivity through a NIC 812, such as a gigabit Ethernet adapter. The NIC 812 is capable of connecting the computer 800 to other computing devices over the network. It should be appreciated that multiple NICs 812 can be present in the computer 800, connecting the computer to other types of networks and remote computer systems. In some examples, the NIC 812 may be configured to perform at least some of the techniques described herein, and may include components for performing the techniques described herein.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the system-architecture 100 and or any components included therein, may be supported by one or more devices similar to computer 800. Stated otherwise, some or all of the operations performed by the system-architecture 100, and or any components included therein, may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As described herein, the computer 800 may comprise one or more of a client device 106, a classification and forwarding node 110, a headend node 112, a service 114, and the like. The computer 800 may include one or more hardware processors 804 (processors) configured to execute one or more stored instructions. The processor(s) 804 may comprise one or more cores. Further, the computer 800 may include one or more network interfaces (e.g., NIC 812) configured to provide communications between the computer 800 and other devices over a network, such as the networks 108 and 824. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for integrating disparate headend traffic ingress services with disparate backend services, securely transiting traffic between networked computing environments, and more.

While the invention is described with respect to the specific examples, it is to be understood that the scope of the invention is not limited to these specific examples. For instance, while many of the examples are described with respect to specific protocols (e.g., GUE, GENEVE, VXLAN, etc.), it should be understood that the techniques described are applicable to other protocols. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A classification and forwarding node comprising:
   one or more processors; and
   one or more non-transitory computer-readable media storing instructions that, when executed by the one or more processors, cause the classification and forwarding node to perform operations comprising:
   receiving, from a first headend node associated with a first cloud-delivered ingress service, a first data packet encapsulated according to a first encapsulation protocol that is supported by the classification and forwarding node;
   modifying a header of the first data packet to include identification metadata;
   determining that the first data packet is to be sent to a first cloud-delivered security service from among a group of cloud-delivered security services;
   determining whether the first encapsulation protocol is supported by the first cloud-delivered security service;

based at least in part on determining that the first cloud-delivered security service supports a second encapsulation protocol different than the first encapsulation protocol:
  encapsulating the first data packet according to the second encapsulation protocol; and
  sending the first data packet to the first cloud-delivered security service.

2. The classification and forwarding node of claim 1, the operations further comprising:
  receiving, from the first cloud-delivered security service, a second data packet encapsulated according to the second encapsulation protocol;
  based at least in part on the second data packet being encapsulated according to the second encapsulation protocol:
  encapsulating the second data packet according to the first encapsulation protocol; and
  sending the second data packet to the first headend node.

3. The classification and forwarding node of claim 1, wherein the classification and forwarding node is a first classification and forwarding node of a first networked computing environment, the operations further comprising:
  receiving, from the first headend node, a second data packet encapsulated according to the first encapsulation protocol;
  determining that the second data packet is to be sent to a second cloud-delivered security service of a second networked computing environment different than the first networked computing environment;
  based at least in part on determining that the second data packet is to be sent to the second cloud-delivered security service:
  refraining from encapsulating the second data packet according to the second encapsulation protocol; and
  sending the second data packet to a second classification and forwarding node of the second networked computing environment such that the second data packet is forwarded to the second cloud-delivered security service.

4. The classification and forwarding node of claim 1, the operations further comprising:
  receiving, from the first headend node, a second data packet encapsulated according to the first encapsulation protocol;
  determining that the second data packet is to be sent to a second cloud-delivered security service from among the group of cloud-delivered security services; and
  based at least in part on determining that the first encapsulation protocol is supported by the second cloud-delivered security service, sending the second data packet to the second cloud-delivered security service.

5. The classification and forwarding node of claim 1, the operations further comprising:
  receiving, from the first headend node, a second data packet encapsulated according to the first encapsulation protocol;
  determining that the second data packet is to be sent to a second headend node different than the first headend node; and
  sending the second data packet to the second headend node.

6. The classification and forwarding node of claim 1, wherein the identification metadata includes at least one of:
  an identifier of a networked computing environment in which the classification and forwarding node is located;
  an indication of an ingress security policy; or
  a globally unique flow identifier.

7. The classification and forwarding node of claim 1, wherein the first data packet is associated with a particular traffic flow between the first headend node and the first cloud-delivered security service, the operations further comprising either one of:
  storing an indication of the particular traffic flow between the first headend node and the first cloud-delivered security service at a location accessible by another classification and forwarding node; or
  sending the indication of the particular traffic flow to the other classification and forwarding node.

8. The classification and forwarding node of claim 1, wherein the first headend node is associated with a first encryption scheme, the operations further comprising:
  receiving, from a second headend node associated with a second encryption scheme, a second data packet encapsulated according to the first encapsulation protocol;
  determining that the second data packet is to be sent to the first cloud-delivered security service;
  based at least in part on determining that the first cloud-delivered security service supports the second encapsulation protocol different than the first encapsulation protocol:
  encapsulating the second data packet according to the second encapsulation protocol; and
  sending the second data packet to the first cloud-delivered security service.

9. A method comprising:
  receiving, from a first headend node associated with a first cloud-delivered ingress service and at a first classification and forwarding node that is associated with a first networked computing environment, a first data packet encapsulated according to a first encapsulation protocol that is supported by the first classification and forwarding node;
  modifying a header of the first data packet to include identification metadata;
  determining, by the first classification and forwarding node, that the first data packet is to be sent to a first cloud-delivered security service from among a group of cloud-delivered security services;
  determining, by the first classification and forwarding node, that the first cloud-delivered security service is associated with a second networked computing environment different than the first networked computing environment;
  based at least in part on determining that the first cloud-delivered security service is associated with the second networked computing environment:
  refraining from encapsulating the first data packet according to a second encapsulation protocol; and
  sending the first data packet to a second classification and forwarding node that is associated with the second networked computing environment.

10. The method of claim 9, further comprising:
  receiving, from the first headend node and at the first classification and forwarding node, a second data packet encapsulated according to the first encapsulation protocol;
  determining, by the first classification and forwarding node, that the second data packet is to be sent to a second cloud-delivered security service from among the group of cloud-delivered security services, the second cloud-delivered security service being associated with the first networked computing environment;

determining, by the first classification and forwarding node, whether the first encapsulation protocol is supported by the second cloud-delivered security service;

based at least in part on determining that the second cloud-delivered security service supports the second encapsulation protocol different than the first encapsulation protocol:

encapsulating the second data packet according to the second encapsulation protocol; and sending the second data packet to the second cloud-delivered security service.

11. The method of claim 9, further comprising:

receiving, from the first headend node and at the first classification and forwarding node, a second data packet encapsulated according to the first encapsulation protocol;

determining, by the first classification and forwarding node, that the second data packet is to be sent to a second cloud-delivered security service from among the group of cloud-delivered security services, the second cloud-delivered security service being associated with the first networked computing environment;

determining, by the first classification and forwarding node, whether the first encapsulation protocol is supported by the second cloud-delivered security service;

based at least in part on determining that the first encapsulation protocol is supported by the second cloud-delivered security service:

refraining from encapsulating the second data packet according to the second encapsulation protocol; and sending the second data packet to the second cloud-delivered security service.

12. The method of claim 9, wherein the identification metadata includes at least one of:

an identifier of a networked computing environment in which the classification and forwarding node is located;

an indication of an ingress security policy; or a globally unique flow identifier.

13. The method of claim 9, wherein the first data packet is associated with a particular traffic flow between the first headend node and the first cloud-delivered security service, the method further comprising either one of storing an indication of the particular traffic flow between the first headend node and the first cloud-delivered security service at a location accessible by another classification and forwarding node or sending the indication of the particular traffic flow to the other classification and forwarding node.

14. A method comprising:

receiving, at a first classification and forwarding node of a first networked computing environment and from a second classification and forwarding node of a second networked computing environment, a first data packet encapsulated according to a first encapsulation protocol that is supported by the first classification and forwarding node and the second classification and forwarding node;

determining, by the first classification and forwarding node, that the first data packet is to be sent to a first cloud-delivered security service from among a group of cloud-delivered security services associated with the first networked computing environment;

determining, by the first classification and forwarding node, whether the first encapsulation protocol is supported by the first cloud-delivered security service;

based at least in part on determining that the first cloud-delivered security service supports a second encapsulation protocol different than the first encapsulation protocol:

encapsulating the first data packet according to the second encapsulation protocol; and sending the first data packet to the first cloud-delivered security service.

15. The method of claim 14, further comprising:

receiving, at the first classification and forwarding node and from the first cloud-delivered security service, a second data packet representing a response to the first data packet, the second data packet encapsulated according to the second encapsulation protocol;

based at least in part on the second data packet being encapsulated according to the second encapsulation protocol:

encapsulating the second data packet according to the first encapsulation protocol; and sending the second data packet to the second classification and forwarding node.

16. The method of claim 14, further comprising:

receiving, at the first classification and forwarding node, a second data packet encapsulated according to the first encapsulation protocol;

determining, by the first classification and forwarding node, that the first data packet is to be sent to a second cloud-delivered security service from among the group of cloud-delivered security services;

determining, by the first classification and forwarding node, whether the first encapsulation protocol is supported by the second cloud-delivered security service;

based at least in part on determining that the first encapsulation protocol is supported by the second cloud-delivered security service:

refraining from encapsulating the second data packet according to the second encapsulation protocol; and sending the second data packet to the second cloud-delivered security service.

17. The method of claim 14, further comprising:

receiving, at the first classification and forwarding node, a second data packet encapsulated according to the first encapsulation protocol;

determining, by the first classification and forwarding node, that the second data packet is to be sent to a second cloud-delivered security service that is associated with the second networked computing environment;

based at least in part on determining that the second data packet is to be sent to the second cloud-delivered security service:

refraining from encapsulating the second data packet according to the second encapsulation protocol; and sending the second data packet to the second classification and forwarding node such that the second data packet is forwarded to the second cloud-delivered security service.

18. The method of claim 14, wherein a header of the first data packet includes identification metadata comprising at least one of:
- an identifier of a networked computing environment in which the second classification and forwarding node is located;
- an indication of an ingress security policy; or
- a globally unique flow identifier.

19. The method of claim 14, further comprising:
- receiving, at the second classification and forwarding node and from a headend node associated with the second networked computing environment, the first data packet;
- determining, by the second classification and forwarding node, that the first data packet is to be sent to the first cloud-delivered security service; and
- refraining from encapsulating the first data packet according to the second encapsulation protocol based at least in part on determining that the first data packet is to be sent to the first cloud-delivered security service.

20. The classification and forwarding node of claim 1, the operations further comprising:
- receiving, from the first cloud-delivered security service, a signal indicating at least one of that the first cloud-delivered security service is at risk of overflowing or that the first cloud-delivered security service is inactive; and
- refraining from forwarding additional traffic to the first cloud-delivered security service based at least in part on the signal.

* * * * *